US012522327B2

(12) United States Patent
Counago Lorenzo et al.

(10) Patent No.: US 12,522,327 B2
(45) Date of Patent: Jan. 13, 2026

(54) PONTOON FOR TRANSPORTING AND PLACING A MARINE WIND TURBINE ON THE SEABED (71) Applicant: ACCIONA CONSTRUCCION, S.A, Alcobendas (ES)

(72) Inventors: Bernardino Counago Lorenzo, Alcobendas (ES); Carlo Paulotto, Alcobendas (ES); Fatima Vellisco Plaza, Alcobendas (ES); Alfonso Capote Garcia, Alcobendas (ES); Carlos Lopez Roman, Alcobendas (ES); Domingo Antonio Gonzalez Suarez, Alcobendas (ES); Ignacio Calvo Herrera, Alcobendas (ES); Juan Manuel Armas Mendez, Alcobendas (ES); Cristina Sanchez De Mena, Alcobendas (ES); Jose Manuel Gonzalez Herrero, Alcobendas (ES); Daniel Zamora Serrano, Alcobendas (ES)

(73) Assignee: ACCIONA CONSTRUCCION, S.A, Alcobendas (ES)

( * ) Notice: Subject to any disclaimer, the term of this patent is extended or adjusted under 35 U.S.C. 154(b) by 341 days.

(21) Appl. No.: 18/250,826

(22) PCT Filed: Oct. 28, 2020

(86) PCT No.: PCT/ES2020/070662
§ 371 (c)(1),
(2) Date: Apr. 27, 2023

(87) PCT Pub. No.: WO2022/090584
PCT Pub. Date: May 5, 2022

(65) Prior Publication Data
US 2023/0391430 A1 Dec. 7, 2023

(51) Int. Cl.
B63B 77/10 (2020.01)
E02B 17/02 (2006.01)
F03D 13/25 (2016.01)

(52) U.S. Cl.
CPC .............. B63B 77/10 (2020.01); E02B 17/02 (2013.01); F03D 13/25 (2016.05)

(58) Field of Classification Search
CPC ....... B63B 35/003; B63B 77/10; F03D 13/25; E02D 23/02; E02B 17/02; E02B 2017/0039
See application file for complete search history.

(56) References Cited

U.S. PATENT DOCUMENTS 8,820,254 B2 * 9/2014 Tosello .................. F03D 13/10
405/209
9,297,355 B2 * 3/2016 Lian ...................... B63B 35/003
(Continued)

FOREIGN PATENT DOCUMENTS

DE 102008046359 A1 3/2010
EP 2495162 A1 9/2012
(Continued)

OTHER PUBLICATIONS

Weber, Klause; Machine Translation DE 102008046359A1, All, Mar. 2010 (Year: 2010).*
(Continued)

Primary Examiner — Benjamin F Fiorello
(74) Attorney, Agent, or Firm — Dennemeyer & Associates LLC (57) ABSTRACT Disclosed is a pontoon (111) for transporting and placing a one-piece marine wind turbine (115) on the seabed, wherein the one-piece wind turbine (115) comprises a base caisson (116) that can be fitted inside the open space of the U-shaped pontoon (111) for transporting, positioning and placing the
(Continued)

base caisson (116) of the marine wind turbine (115) on the seabed, by ballasting the base caisson (116) and the U-shaped pontoon (111) in a synchronised manner using seawater.

8 Claims, 5 Drawing Sheets

(56) References Cited

U.S. PATENT DOCUMENTS

| | | | | |
|---|---|---|---|---|
| 9,914,505 | B2* | 3/2018 | Nordstrom | B63B 77/10 |
| 11,066,138 | B2* | 7/2021 | Sato | B63B 77/10 |
| 2004/0262926 | A1* | 12/2004 | Hansen | F03D 13/10 |
| | | | | 290/44 |
| 2011/0139056 | A1* | 6/2011 | Cholley | F03D 13/10 |
| | | | | 405/209 |
| 2013/0121770 | A1* | 5/2013 | Li | E02B 17/02 |
| | | | | 405/207 |
| 2017/0120993 | A1* | 5/2017 | Amate López | F03D 13/25 |

FOREIGN PATENT DOCUMENTS

| | | |
|---|---|---|
| FR | 2887900 A1 | 1/2007 |
| GB | 2454585 A | 5/2009 |
| WO | 03055741 A1 | 7/2003 |

OTHER PUBLICATIONS

International search report for PCT/ES2020/070662 mailed on Dec. 14, 2020.

* cited by examiner

FIG. 6

PONTOON FOR TRANSPORTING AND PLACING A MARINE WIND TURBINE ON THE SEABED

CROSS-REFERENCE TO RELATED APPLICATIONS

This is a 35 U.S.C. 371 National Stage Patent Application of International Application No. PCT/ES2020/070662, filed Oct. 28, 2020, of which is hereby incorporated by reference in its entirety.

OBJECT OF THE INVENTION

The present invention relates to a submersible floating pontoon for transporting a marine wind turbine from a port to an installation position, where the floating pontoon is lowered together with the marine wind turbine until the base caisson of the wind turbine is placed on the seabed.

STATE OF THE ART

In general, a marine wind turbine is known in the state of the art which generally comprises a motor with several blades and a horizontal shaft, an electrical generator mechanically coupled to the motor, which are fixed to the upper end of a vertically elongated support, such as a mast or post, and a base caisson mechanically coupled to the lower end of the post opposite the upper end of the post.

The marine wind turbine is transported in one piece using a floating pontoon comprising two side floats arranged in parallel and mechanically attached to one another by an attachment transverse structure that mechanically connects one of the ends of the two side floats, forming a U-shaped floating structure. The U-shaped floating pontoon receives the base caisson of the marine wind turbine through the opening of the U-shaped floating pontoon.

The floating pontoon transports the marine wind turbine to the installation or anchoring position on the seabed, where the floating pontoon and the wind turbine caisson are lowered to the seabed.

The floating pontoon is equipped with pressure means distributed between the two parallel side floats to maintain the base caisson between the two parallel side floats while transporting the marine wind turbine and to place the marine wind turbine from the sea surface to the seabed.

These pressure means for maintaining and placing the marine wind turbine between the parallel side floats represent a high volume and weight of the U-shaped floating pontoon during the method for transport and installation of the marine wind turbine from the port to the installation position on the seabed.

SUMMARY

The present invention seeks to solve one or more of the drawbacks set forth above by means of a pontoon for transporting and placing a marine wind turbine on the seabed as claimed in the claims.

The one-piece wind turbine comprises a base caisson that can be fitted inside the open space of the U-shaped pontoon for transporting, positioning and placing the base caisson of the marine wind turbine on the seabed, by ballasting the base caisson and the U-shaped pontoon in a synchronised manner using seawater. Therefore, the base caisson and the U-shaped pontoon are submersible at the same time, simultaneously, and can be unballasted separately to float the U-shaped pontoon and leave the one-piece marine wind turbine placed on the seabed.

The U-shaped pontoon comprises two floatable and submersible side pontoons with longitudinal axes parallel to a central horizontal longitudinal axis X, a floatable and submersible transverse attachment pontoon mechanically coupling the two floatable and submersible side pontoons, which extends along a horizontal longitudinal axis Y perpendicular to the central horizontal longitudinal axis X, and a plurality of first watertight compartments uniformly distributed throughout the pontoons of the U-shaped pontoon, which can be ballasted and unballasted using seawater, and at least two vertical columns extending upwards from an upper horizontal deck of the U-shaped pontoon.

The base caisson that can be fitted inside the open space of the U-shaped pontoon comprises a plurality of second watertight compartments distributed uniformly throughout the base caisson, which can also be ballasted and unballasted using seawater. The base caisson further comprises two upper side wings facing each other with longitudinal axes parallel to the central horizontal longitudinal axis X of the U-shaped pontoon.

Parallel upper side wings are arranged along corresponding facing outer edges of the upper deck of the base caisson. The vertical columns comprise a plurality of third watertight compartments uniformly distributed throughout the vertical columns which can be ballasted and unbalanced using seawater in a synchronised manner with the first watertight compartments and the second watertight compartments.

The parallel side pontoons of the U-shaped pontoon comprise inner edges of the parallel side pontoons which are configured to form corresponding seats for the corresponding parallel upper side wings of the base caisson, such that the parallel upper side wings are maintained in physical contact with the corresponding upper side seats by the synchronised action of the ballasting of the U-shaped pontoon and the base caisson.

The pontoons of the U-shaped pontoon exhibit a vertical cross-section having a cross-section height lower than the vertical cross-section height of the base caisson.

Another object relates to a method for lifting, transporting, positioning and placing a one-piece marine wind turbine which comprises a base caisson that can be fitted inside the open space of the U-shaped pontoon, transporting a one-piece wind turbine from the assembly site in the port to the installation area at sea with the U-shaped pontoon, the method comprising the successive steps of Partial ballasting of the first watertight compartments of the U-shaped pontoon, such that the pontoon develops a vertical movement until the upper side seats of the side pontoons reach a height above the water level that is lower than the height of the lower surface of the upper side wings of the base caisson, Horizontal displacement of the U-shaped pontoon until the base caisson is fitted inside the U-shaped open space, Partial unballasting of the first watertight compartments of the U-shaped pontoon, such that the pontoon develops a vertical upward movement until the upper side seats of the side pontoons come into physical contact with the upper side wings of the base caisson, Synchronised partial unballasting of the first watertight compartments of the U-shaped pontoon and of the second watertight compartments of the base caisson of the wind turbine until the base caisson assembly fitted inside the U shape of the pontoon achieves a situation of buoyancy, Transport by sea and positioning at sea of the base caisson assembly fitted inside the U shape of the pontoon in the positioning area, Synchronised ballasting of the first watertight compartments of the U-shaped pontoon and of the second watertight compartments of the base caisson of the wind turbine until the base caisson is arranged on the seabed, Complete ballasting of the first watertight compartments of the U-shaped pontoon, such that the pontoon develops a vertical movement towards the seabed until the upper side seats of the side pontoons lose physical contact with the lower surface of the upper side wings of the base caisson arranged on the seabed, Horizontal displacement of the U-shaped pontoon until the base caisson is released or disengaged from the U-shaped open space, and Partial unballasting of the first watertight compartments of the U-shaped pontoon, such that the pontoon develops a vertical upward movement until the upper deck of the U-shaped pontoon is above the level of the water surface.

Once the marine wind turbine is settled by gravity on the seabed, the U-shaped pontoon is released with respect to the base caisson by increasing the ballasting of the U-shaped pontoon, horizontally displacing this pontoon, moving it away from the installed base caisson and, then, the pontoon is refloated to be used in the installation of other marine wind turbines.

In summary, the lowering of the marine wind turbine to the seabed is carried out by means of the synchronised ballasting of the base caisson and the side and transverse pontoons of the U-shaped pontoon.

The U-shaped pontoon is easy to manufacture and does not require being equipped with complex clamping and guiding equipment between the different pontoons of the pontoon, thus considerably reducing the construction cost and complexity of the U-shaped pontoon.

Therefore, the offshore installation of large marine wind turbines assembled in one piece is simplified with the pontoon U-shaped floatable and submersible simultaneously with respect to the base caisson of the wind turbine, which can be fitted in the U-shaped open space of the pontoon, facilitating the transport of the wind turbine by sea to its installation site.

BRIEF DESCRIPTION OF THE FIGURES

A more detailed explanation of the invention is given in the following description based on the attached figures in which.

DETAILED DESCRIPTION

In relation to FIGS. 1 to 3 and 6, where a floating and submersible pontoon 111 for lifting, transporting, positioning and placing or installing a one-piece marine wind turbine 115 on the seabed is shown.

Figure 1:
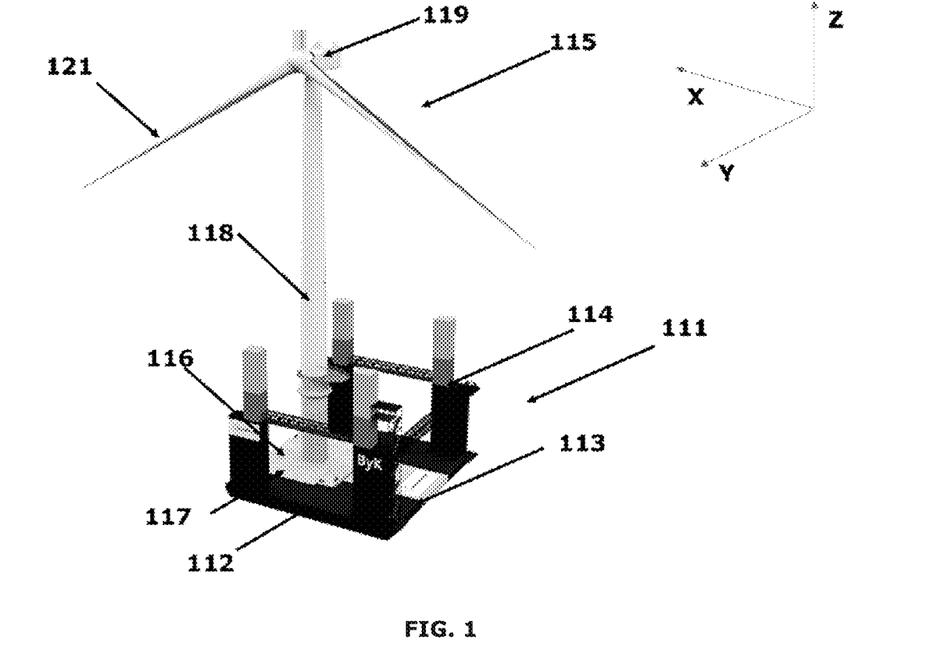
FIG. 1 shows in a perspective view of a base caisson of a marine wind turbine fitted inside the open space of a U-shaped pontoon.
Figure 4:
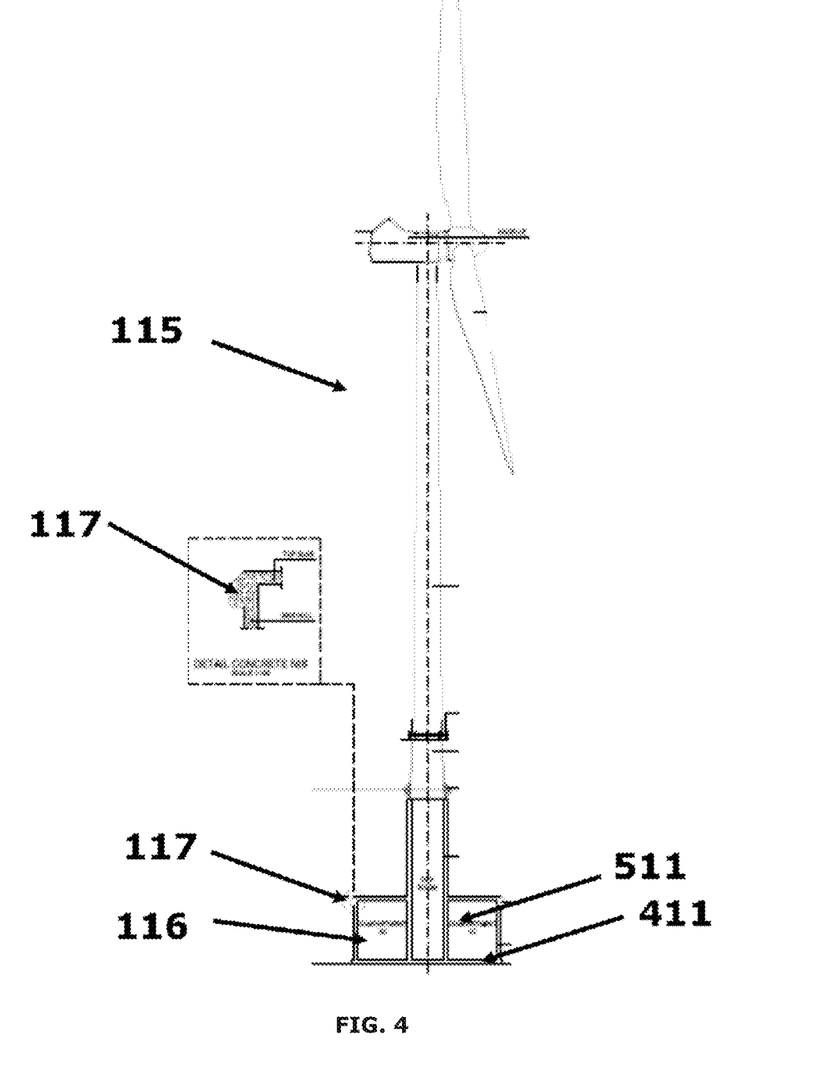
FIG. 4 shows an elevational view of a cross-section of the base caisson of the assembled, one-piece marine wind turbine.
Figure 5:
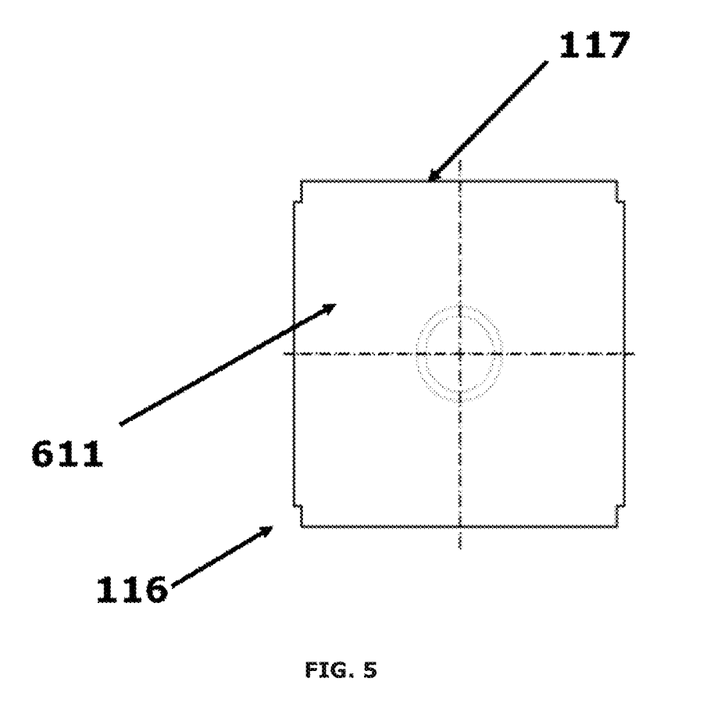
FIG. 5 shows a plan view of the base caisson of the marine wind turbine.

Now in relation to FIGS. 1, 4 and 5, where the one-piece marine wind turbine 115 is shown, it comprises a parallelepiped base caisson 116 intended to rest or be installed on the seabed, a tower 118 that has a lower end coupled to the base caisson 116 and an upper end opposite the lower end mechanically coupled to a nacelle 119 comprising a three-blade rotor 121.

Figure 6:
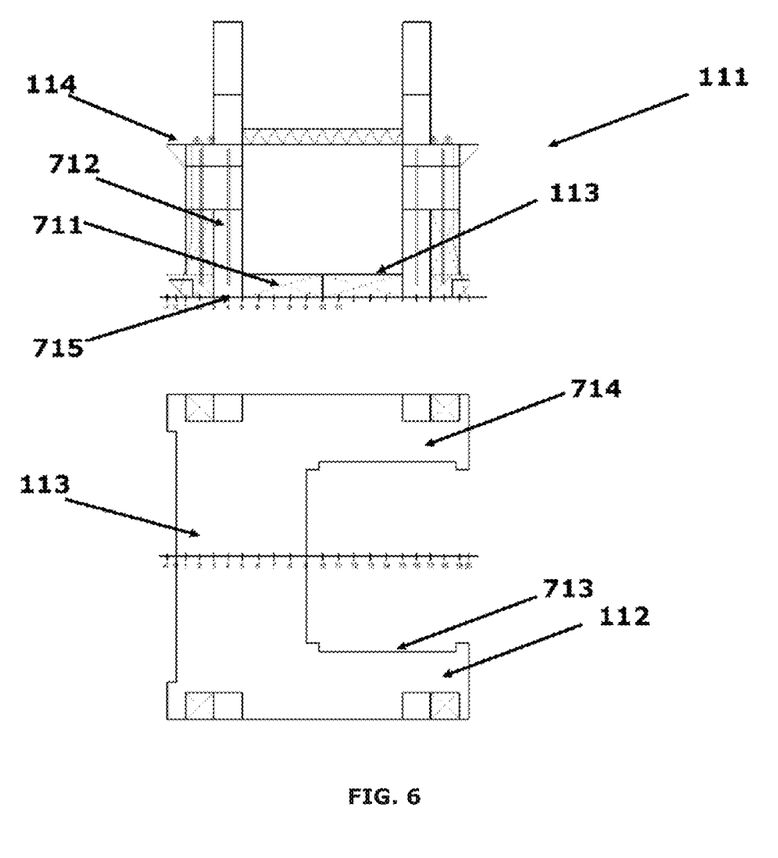
FIG. 6 shows an elevational view of a cross-section of the U-shaped pontoon and a plan view of the U-shaped pontoon.

Now in relation to FIGS. 1 and 6, where the submersible floating pontoon 111 is shown, it comprises two submersible floating side pontoons 112 with longitudinal axes parallel to a central horizontal longitudinal axis X, a submersible floating transverse attachment pontoon 113 mechanically coupling the two facing submersible floating side pontoons, which extends along a horizontal longitudinal axis Y perpendicular to the central horizontal longitudinal axis X, and at least two vertical columns 114, extending upwards from the upper horizontal deck 113 of the U-shaped pontoon 111.

The U-shaped pontoon 111 is specially developed for operations at sea and the U-shaped open space between the two side pontoons 112 is sized to receive, fit and externally border the outer perimeter of the base caisson 116 of the one-piece wind turbine 115. The open space between the facing side floats 112 is large enough to encircle the base caisson 116 of the wind turbine 115 inside the open space of the U-shaped pontoon 111.

The side pontoons 112 and the transverse attachment pontoon 113 comprise a plurality of first watertight compartments 711 distributed homogeneously throughout the entire volume of the different floating pontoons 112, 113 enabled to be ballasted and unballasted using a working fluid, such as seawater.

Likewise, the base caisson 116 of the one-piece marine wind turbine 115 comprises a plurality of second watertight compartments 511 distributed homogeneously throughout the entire volume of the base caisson 116, also prepared to be ballasted and unballasted using a working fluid, namely, seawater.

The first watertight compartments 711 and the second watertight compartments 511 are adapted to be ballasted and unballasted in a synchronised manner to provide an attachment that limits any relative vertical movement and any relative horizontal movement between the base caisson 116, the floating pontoons 112 and the transverse attachment pontoon 113 of the U-shaped pontoon 111 when the base caisson 116 is housed inside the open space between the two side U-shaped pontoons 112. This is because weight distribution is important for the seaworthiness and stability of the U-shaped pontoon 111 and one-piece wind turbine 115 assembly, which allows the U-shaped pontoon 111 to function in a stable manner to displace one-piece marine wind turbines 115, carrying out the transport of the wind turbine 115 safely and stably.

The level of ballasting and unballasting of the first watertight compartments 711, the second watertight compartments 511 and the third watertight compartments 712 is dependent on the corresponding step of lifting, transporting, positioning and placing the installation of the marine wind turbine 115 at all times. For example, during the step of transporting, the first watertight compartments 711 and the second watertight compartments 511 are partially ballasted or unballasted and cooperate to block any relative vertical and horizontal movement of the base caisson 116 with respect to each of the pontoons 112, 113 of the U-shaped pontoon 111.

If the first watertight compartments 711 and the second watertight compartments 511 are partially ballasted or unballasted, they exert horizontal and vertical thrusts in the reverse direction between each one of the two opposite external side walls of the base caisson 116 and, respectively, each one of the internal side walls of the facing side pontoons 112 and the transverse attachment pontoon 113 of the U-shaped pontoon 111, thus preventing any relative horizontal and vertical movement of the base caisson 116 with respect to the floating pontoons 112, 113 of the U-shaped pontoon 111.

The base caisson 116 comprises two facing upper side wings 117 with longitudinal axes parallel to the central horizontal longitudinal axis X of the U-shaped pontoon 111. The upper side wings 117 are arranged along corresponding facing outer edges of the upper deck 611 of the base caisson 116 of the wind turbine 115.

Portions of the upper deck of the U-shaped pontoon 111 corresponding to the inner edges of the parallel side pontoons 112 are configured to form a seat 713 for the corresponding parallel upper side wings 117 of the base caisson 116 of the wind turbine.

The outer wall of the base caisson 116 of the wind turbine 115 faces the open sea in the opposite direction with respect to the rear wall of the open space of the U-shaped pontoon 111, and does not comprise a side wing. The open space between the two U-shaped side pontoons 112 borders on the outside in close proximity to the rest of the three outer walls of the base caisson 116 of the one-piece wind turbine 115.

If the base caisson 116 of the one-piece wind turbine 115 is arranged inside the open space of the U-shaped pontoon 111, they form a floating structure which can be ballasted and unballasted in a synchronised manner to lift the base caisson 116 and anchor the base caisson 116 of the one-piece marine wind turbine 115 on the seabed.

The lifting, transport, positioning and placing of the marine wind turbine 115 in the installation position on the seabed is carried out according to the Archimedean principle by means of synchronised ballasting/unballasting of the U-shaped pontoon 111 and the base caisson 116 of the marine wind turbine 115. Lifting is carried out mainly vertically.

Figure 2:
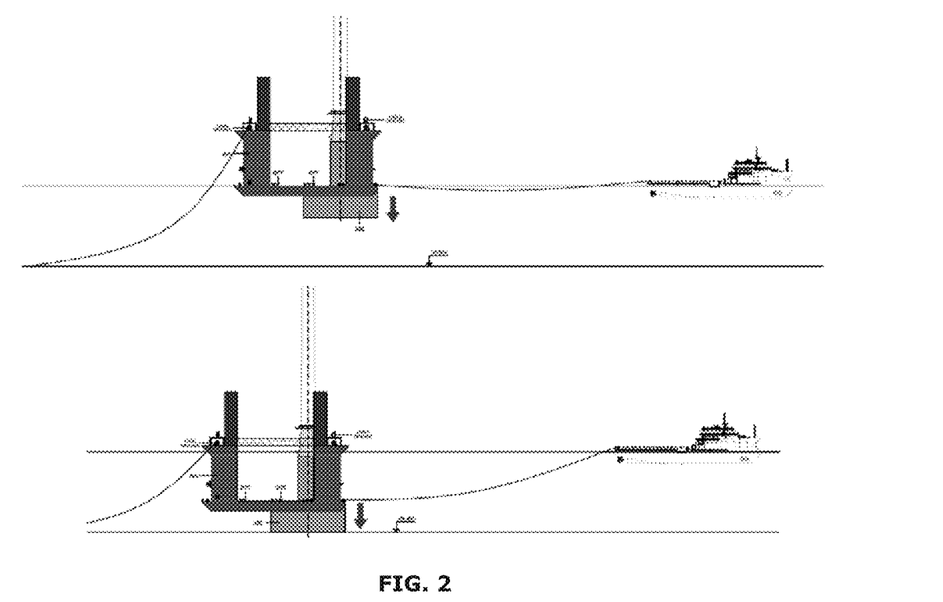
FIG. 2 shows an elevational view of a detail of the step of placing the base caisson of the marine wind turbine on the seabed, by the synchronised ballasting of the base caisson of the marine wind turbine fitted inside the open space of the U-shaped pontoon.

Now in relation to FIG. 2, the floating pontoons 1112, 113 of the U-shaped pontoon 111 exhibit a cross-section having a lower section height than the cross-section height of the base caisson 116 of the marine wind turbine 115, such that the U-shaped pontoon 111 can fit in the base caisson 116 inside the U-shaped open space to lift it, transport it and place it on the seabed without requiring elements for being fastened to or interlocked with the pontoons 112, 113 of the U-shaped pontoon 111, by means of the synchronised ballasting and unballasting of the first watertight compartments 711 of the U-shaped pontoon 111, of the second watertight compartments 611 of the base caisson 116 of the marine wind turbine 115 and of the third watertight compartments 712 of the vertical columns using seawater.

Therefore, during the transport and placing on the seabed, a part of the base caisson 116 projects from the lower deck 715 of the U-shaped pontoon 111 towards the seabed, such that the lower deck 715 of the U-shaped pontoon 111 avoids coming into physical contact with the seabed.

The part of the base caisson 116 that projects from the lower deck 715 of the U-shaped pontoon 111 towards the seabed provides stability and seaworthiness to the marine wind turbine 115 assembly fitted in the open space of the U-shaped pontoon.

Therefore, the lower deck 715 of the U-shaped pontoon 111 is below the surface of the seawater and, in turn, the lower surface 411 of the base caisson 116 is below the lower deck 715 of the U-shaped pontoon 111 if the marine wind turbine 115 is lifted from an assembly area to transport, position and place same on the seabed.

The lowering to the seabed of the marine wind turbine 115 is carried out solely by the synchronised ballasting of the first watertight compartments 711 of the side pontoons 112 and of the transverse attachment pontoon 113 of the U-shaped pontoon 111, and of the second watertight compartments 511 of the base caisson 116 of the marine wind turbine 115 and of the third watertight compartments 712 of the vertical columns 114, such that the pontoons 1112, 113 of the U-shaped pontoon 113 are in an active submerged position, without resorting to means for lifting/lowering the wind turbine 115 by relative movement of the wind turbine 115 with respect to the pontoons 112, 113 of the U-shaped pontoon 111. The pontoons 112, 113 of the U-shaped pontoon 111 are lowered simultaneously with the base caisson 116 of the marine wind turbine 115, without ever reaching the seabed level.

Once the base caisson 116 is placed on the seabed, the step of disengaging the U-shaped pontoon 111 from the base caisson 116 placed on the seabed, a vertical displacement is developed according to a vertical longitudinal axis Z perpendicular to the central horizontal longitudinal axis X and to the horizontal longitudinal axis Y, towards the seabed to disengage or release the upper side wings 117 of the base caisson 116 of the corresponding seats 713 of the side pontoons 112 without the lower deck 715 of the side pontoons reaching or coming into contact with the seabed. Once the upper side wings 117 have ceased to be in contact with the corresponding seats 713, the U-shaped pontoon 111 performs a horizontal displacement manoeuvre according to the central horizontal longitudinal axis X in the opposite direction with respect to the open space of the U-shaped pontoon 111 to disengage or release the base caisson 116 which is placed on the seabed, and when the base caisson 116 is released, that is, has lost physical contact with the U-shaped pontoon 111, the first watertight compartments 711 of the side pontoons 112 and of the transverse attachment pontoon 113 of the U-shaped pontoon 111 and the third watertight compartments 712 of the vertical columns 114 are unballasted until the upper deck 714 of the U-shaped pontoon 111 is above the level of the water surface, that is, the pontoons 112, 113 of the U-shaped pontoon 111 are in an active floating position.

The rest of the dimensions, width and length, of the pontoons 112, 113 of the U-shaped pontoon 111 are suitable for lifting, transporting, positioning and placing the assembled, one-piece marine wind turbine 115 on the seabed.

Due to the U shape of the floating pontoon 111, the latter generally exhibits a relatively low torsional rigidity with respect to the central horizontal longitudinal axis X. However, by fitting the base caisson 116 inside the U-shaped open space and retaining the base caisson 116 by means of the synchronised ballasting and unballasting of the first watertight compartments 711, which exert an upward thrust, of the U-shaped pontoon 111 and of the second watertight compartments 511, which exert a downward thrust, of the base caisson 116 of the marine wind turbine 115 both in the horizontal plane and in the vertical plane, the torsional rigidity of the U-shaped pontoon 111 and marine wind turbine 115 assembly fitted in this pontoon 111.

The vertical columns 114 are facing one another, arranged on different facing side pontoons 112 to provide hydrostatic stability and improve the behaviour of the U-shaped floating pontoon 111. The horizontal cross-section of the vertical columns 114 is less than the vertical cross-section of the side pontoons 112 above which the vertical columns 114 rise, such that if the facing side pontoons 112 are in the fully submerged position due to complete ballasting, the upper end of the vertical columns protrudes above the seawater level.

The vertical columns 114 also comprise a plurality of third watertight compartments 712, which can be ballasted and unballasted in a synchronised manner with the first watertight compartments 711 of the U-shaped pontoon 111 and the second watertight compartments 511 of the base caisson 116 of the marine wind turbine 115.

The joint action due to the complete or partial ballasting or unballasting of the third watertight compartments 712, of the first watertight compartments 711 and of the second watertight compartments 511 make it possible to place the wind turbine 115 on the seabed, keeping it fitted inside the U-shaped open space of the pontoon 111 while lowering the base caisson assembly 116 fitted in the U-shaped pontoon 111.

In summary, if the pontoons 112, 113 of the U-shaped pontoon 111 are in the fully submerged position, maximum ballasting, the upper end of the vertical columns 114 are above the water level. The vertical columns 114 provide stability to the base caisson 116 and pontoon 111 assembly while lowering the pontoon 111 and the wind turbine 115 to the seabed.

The vertical columns 114 provide a positive buoyancy, which provides stabilisation to the base caisson assembly 116 fitted in the U-shaped pontoon 111 while lowering the base caisson 111 assembly fitted in the U-shaped pontoon 111 to the seabed to place the wind turbine 115 on the seabed.

The vertical columns 114 are spaced apart from each other and located at the ends of the side pontoons 112, therefore distributed homogeneously on the upper deck 714 of the U-shaped pontoon 111. The vertical columns 114 make it possible to reduce the vertical cross-section height of the pontoons 112, 113 of the U-shaped pontoon 111, which makes it possible to place the base caisson safely in the installation area of the marine wind turbine.

The U-shaped pontoon 111 comprises four vertical columns 114 arranged at the corresponding opposite ends of the side pontoons 112 of the U-shaped pontoon 111, making it possible to obtain a maximised space between the vertical columns 114, contributing to the stabilisation of the U-shaped pontoon 111.

Figure 3:
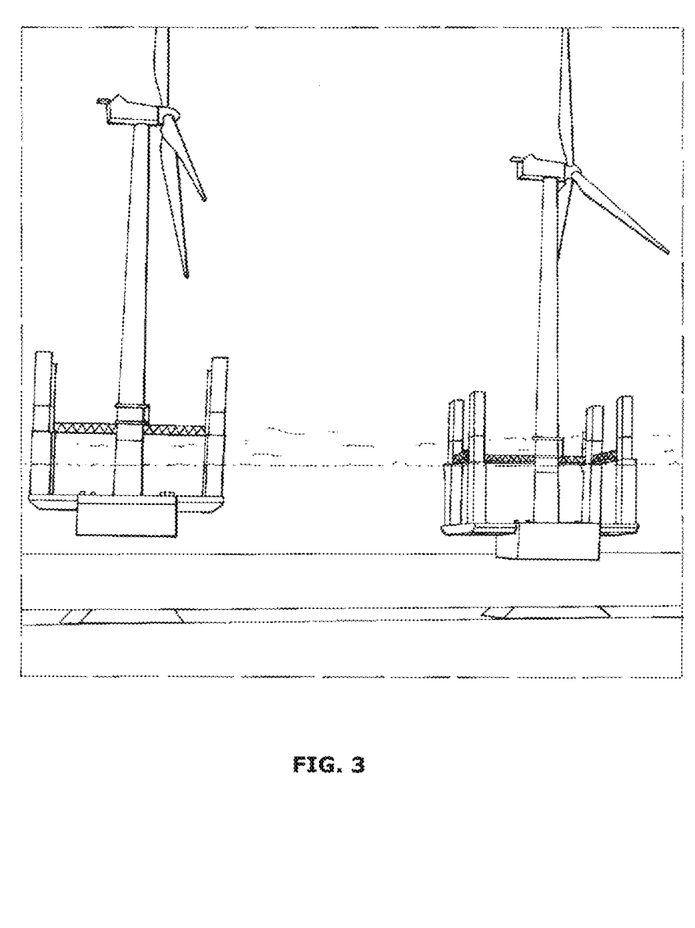
FIG. 3 shows an elevational view of a detail of the steps of transporting and positioning the base caisson fitted inside the open space of the U-shaped pontoon.

Now in relation to FIGS. 2 and 3, the method for lifting, transporting, positioning and placing the marine wind turbine 115 on the seabed comprises the successive steps of:

Partial ballasting of the first watertight compartments of the U-shaped pontoon, such that the pontoon develops a vertical movement until the upper side seats of the side pontoons reach a height above the water level that is lower than the height of the lower surface of the upper side wings of the base caisson, Horizontal displacement of the U-shaped pontoon until the base caisson is fitted inside the U-shaped open space, Partial unballasting of the first watertight compartments of the U-shaped pontoon, such that the pontoon develops a vertical upward movement until the upper side seats of the side pontoons come into physical contact with the upper side wings of the base caisson, Synchronised partial unballasting of the first watertight compartments of the U-shaped pontoon and of the second watertight compartments of the base caisson of the wind turbine until the base caisson assembly fitted inside the U shape of the pontoon achieves a situation of buoyancy, Transport by sea and positioning at sea of the base caisson assembly fitted inside the U shape of the pontoon in the positioning area, Synchronised ballasting of the first watertight compartments of the U-shaped pontoon and of the second watertight compartments of the base caisson of the wind turbine until the base caisson is arranged on the seabed, Complete ballasting of the first watertight compartments of the U-shaped pontoon, such that the pontoon develops a vertical movement towards the seabed until the upper side seats of the side pontoons lose physical contact with the lower surface of the upper side wings of the base caisson arranged on the seabed, Horizontal displacement of the U-shaped pontoon until the base caisson is released or disengaged from the U-shaped open space, and Partial unballasting of the first watertight compartments of the U-shaped pontoon, such that the pontoon develops a vertical upward movement until the upper deck of the U-shaped pontoon is above the level of the water surface.

The invention claimed is:

1. A pontoon for transporting and placing a one-piece marine wind turbine on the seabed, characterised in that the pontoon is U-shaped and the one-piece wind turbine (115) comprises a base caisson (116) that can be fitted inside the open space of the U-shaped pontoon (111) for transporting, positioning and placing the base caisson (116) of the marine wind turbine (115) on the seabed, by ballasting the base caisson (116) and the U-shaped pontoon (111) in a synchronised manner using seawater, wherein the base caisson (116) can be fitted inside the open space of the U-shaped pontoon (111) comprises a plurality of second watertight compartments (511) uniformly distributed throughout the base caisson (116) which can be ballasted and unballasted using seawater od wherein the base caisson (116) comprises two upper side wings (112) facing each other with longitudinal axes parallel to the central horizontal longitudinal axis X of the U-shaped pontoon (111).

2. The pontoon according to claim 1, wherein the U-shaped pontoon (111) comprises two submersible floating side pontoons (112) with longitudinal axes parallel to a central horizontal longitudinal axis X, a submersible floating transverse attachment pontoon (113) mechanically coupling the two submersible floating side pontoons (112), which extends along a horizontal longitudinal axis Y perpendicular to the central horizontal longitudinal axis X, and a plurality of first watertight compartments (711) uniformly distributed throughout the pontoons (112, 113) which can be ballasted and unballasted using seawater.

3. The pontoon according to claim 2, wherein the U-shaped pontoon (111) further comprises at least two vertical columns (114) extending upwards from an upper horizontal deck (714) of the U-shaped pontoon (111).

4. The pontoon according to claim 2, wherein the floating pontoons (112, 113) of the U-shaped pontoon (111) exhibit a vertical cross-section having a cross-section height lower than the vertical cross-section height of the base caisson (116).

5. The pontoon according to claim 1, wherein the parallel upper side wings (117) are arranged along corresponding facing outer edges of the upper deck (611) of the base caisson (116) of the wind turbine (115).

6. The pontoon according to claim 1, wherein the vertical columns (114) comprise a plurality of third watertight compartments (712) uniformly distributed throughout the vertical columns (114) which can be ballasted and unballasted using seawater in a synchronised manner with the first watertight compartments (711) and the second watertight compartments (511).

7. The pontoon according to claim 1, wherein the parallel side pontoons (112) of the U-shaped pontoon (111) comprises inner edges of the parallel side pontoons which are configured to form corresponding seats (713) for the corresponding parallel upper side wings (117) of the base caisson (116).

8. A method for transporting, positioning an placing and decommissioning a one-piece marine wind turbine which comprises a base caisson (116) that can be fitted inside the open space of a U-shaped pontoon (111), characterised in that the method comprises the successive steps of:

Partial ballasting of a first watertight compartments of the U-shaped pontoon, such that the pontoon develops a vertical movement until an upper side seats of one side of the U-shaped pontoons reaches a height above the water level that is lower than the height of the lower surface of an upper side wings of the base caisson, Horizontal displacing the U-shaped pontoon until the base caisson is fitted inside the U-shaped open space, Partial unballasting of the first watertight compartments of the U-shaped pontoon, such that the pontoon develops a vertical upward movement until the upper side seats of the side pontoons come into physical contact with the upper side wings of the base caisson, Synchronised partial unballasting of the first watertight compartments of the U-shaped pontoon and of a second watertight compartments of the base caisson of the wind turbine until the base caisson assembly fitted inside the U shape of the pontoon achieves a situation of buoyancy, Transporting by sea and positioning at sea of the base caisson assembly fitted inside the U shape of the pontoon in the positioning area, Synchronised ballasting of the first watertight compartments of the U-shaped pontoon and of the second watertight compartments of the base caisson of the wind turbine until the base caisson is arranged on the seabed, Complete ballasting of the first watertight compartments of the U-shaped pontoon, such that the pontoon develops a vertical movement towards the seabed until the upper side seats of the side pontoons lose physical contact with the lower surface of the upper side wings of the base caisson arranged on the seabed, Horizontal displacing the U-shaped pontoon until the base caisson is released or disengaged from the U-shaped open space, and Partial unballasting of the first watertight compartments of the U-shaped pontoon, such that the pontoon develops a vertical upward movement until an upper deck of the U-shaped pontoon is above the level of the water surface.

\* \* \* \* \*